Figure 1:
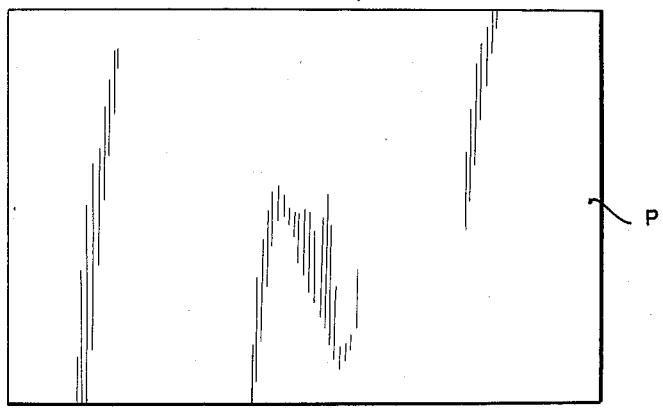

Dec. 6, 1955   B. H. ARMSTRONG   2,726,156
FROZEN PIE CRUST DOUGH AND METHOD OF PREPARATION THEREFOR
Filed June 4, 1954

INVENTOR
BILLIE H. ARMSTRONG
BY *A. Yates Dowell*
ATTORNEY

United States Patent Office 2,726,156
Patented Dec. 6, 1955

2,726,156

FROZEN PIE CRUST DOUGH AND METHOD OF PREPARATION THEREFOR

Billie Hamilton Armstrong, Hohenwald, Tenn.

Application June 4, 1954, Serial No. 434,611

4 Claims. (Cl. 99—92)

This invention relates to foods and the preparation thereof and more particularly to the preparation of foods which have to be cooked, specifically dough used for pie crusts and the like.

In the growing family of frozen food products which have become available commercially within recent years, the single class of item which comprises one of the newest additions is pies. These pies include, among the several varieties thereof, meat, fowl, fish, fruit, vegetable and other substances, and such pies are prepared within self-supporting containers and then quick-frozen so that the commercially available item need only be baked for an appropriate period of time to be ready for human consumption.

Fruits and such other food items which contain a relatively high water content or for various other reasons suffer deterioration either upon the freezing thereof or the subsequent thawing, are substantially numerous and limitations are thus imposed upon the expansion of the frozen pie industry as such.

It has long been recognized in this particular art that the pastry or dough portion of the pie determines to a great extent the quality of the finished article, skill being required in the preparation thereof whereas no such problems are present in connection with the preparation of the filling. It has been proposed to prepare a frozen pie crust, readily available to the housewife, cook, chef, or the like, where complete uniformity together with superiority of finished product can be achieved without the necessity for the painstaking preparation of such pie crust, this latter step being one which even those particularly skilled find relatively impossible of achievement.

Present day commercial practices produce satisfactory frozen pie crust in the frozen pies to which reference has been made herein before. However, it must be borne in mind that such pies are preformed in self-sustaining containers which are the rigid equivalents of pie tins or baking pans. Vastly different problems are presented when consideration is given to the inventive concept where only the pie crust is provided, such crust presenting problems in the handling thereof prior to freezing, the shipment thereof as an article of commerce and, most important, the handling thereof following the required thawing step, prior to the filling thereof with the desired center with the coincident necessity for shaping, edging, and, where desired, covering of the filling during the baking operation.

Among the problems requiring solution with respect to the handling of the pie crust dough prior to shipment and subsequent to thawing, the inherent fragility of the dough including a requisite degree of "shortness" is of paramount importance. Among the issues requiring solution with respect to the shipment in commerce of the frozen pie crust dough, the factor of economy of space, i. e. the physical size and shape of the commercial package, is of paramount importance to the manufacturer and shipper, to the retailer where space in a frozen food storage and vending compartment is at a premium, and also to the consumer who must maintain the item at an appropriate temperature either in the freeze compartment of a refrigerator or in a so-called deep-freeze until the appropriate time for thawing prior to actual use.

Accordingly, it is an object of the invention to provide a novel method for the preparation of a pie crust dough which may be pre-formed into sheets of appropriate size and thickness and which may be conveniently packaged and quick-frozen for shipment as an article of commerce.

Another object of the invention is to provide a novel method for the manufacture and packaging of a frozen pie crust dough.

A further object of the invention is to provide a frozen pie crust dough which may be conveniently thawed and readily handled with little likelihood of inadvertent damage thereto during the required shaping and filling thereof in the preliminary steps attendant to the baking of a pie.

Another object of the invention is to provide a novel pie crust dough which may be manufactured economically, handled and packaged expeditiously prior to quick freezing and shipment as an article of commerce.

A still further object of the invention is to provide a novel frozen pie crust dough which is preformed, may be readily thawed, and will be available immediately to the skilled or unskilled baker for use in connection with the baking of a pie of any character, the finished pie having a pastry of uniform superiority.

Figure 2:
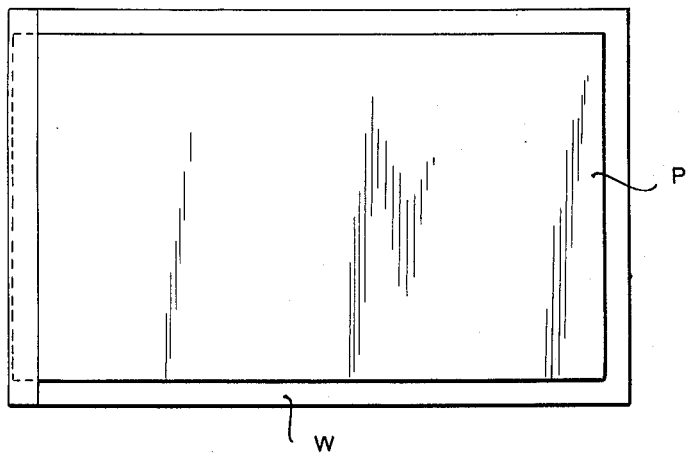
Figure 3:
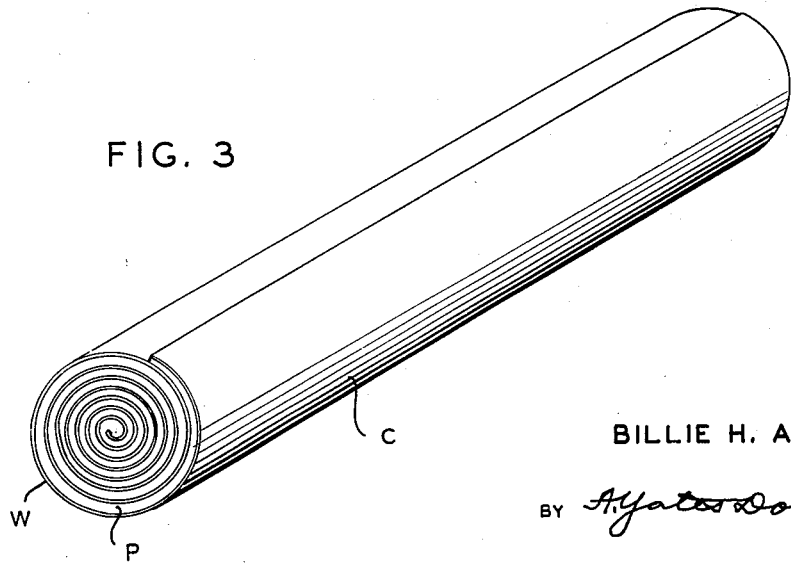

Further objects and advantages of the present invention will be readily apparent from the following description taken in conjunction with the accompanying drawing wherein:

Fig. 1 is a plan view of a preformed pie crust in accordance with the present invention;

Fig. 2 a plan view of the pie crust of Fig. 1 illustrating the initial step in connection with the packaging thereof; and Fig. 3 a perspective view of the pie crust dough in commercial rolled form for packaging and quick freezing.

A principal consideration in the preparation commercially of a dough pre-formed to provide pie crusts, is the inherent thickness of the finished article and the difficulties in the handling thereof to avoid tearing, puncturing, or otherwise damaging the crust. Desirably, pie crust is of a thickness approximating one-sixteenth of an inch and while the size of an individual crust may vary within reasonable limits, dependent upon the size of the finished pie under contemplation, a highly desirable size approximates twelve by eighteen inches, providing a sheet of material having an area of approximately two hundred and sixteen square inches with a squared or rounded peripheral configuration as may be preferred. It will be understood that such dough, intended for use as a pie crust, presents grave problems in the handling thereof, even where the prospective baker may wish merely to deposit or place the same in a pie tin preparatory to the baking of a pie.

Where it is intended to produce such a pie crust for commercial use with the inherent complexities of handling and packaging by the manufacturer and a further handling by the ultimate consumer, these problems are multiplied many times and prior art teachings have afforded no solution therefor.

Desirably pie crusts are produced from a soft wheat flour, comprising flour produced from a summer-ripening flour termed in the trade "pastry flour." However, pie crust produced from such pastry flour has a tendency to adhere to the surface upon which produced, such production being accomplished generally through a rolling process, whereby efforts to elevate the pie crust, preparatory to placing within a pie tin or other suitable baking receptacle, resulted in the distortion through stretching of the pie crust with a ready tendency to the tearing thereof.

It has been recognized that hard wheat flour, comprising flour produced from a winter-ripening wheat, provides a dough of greater "toughness" and accompanying resiliency than a dough produced from soft wheat or pastry flour, and such a dough is particularly suitable for the manufacture of bread as distinguished from the finer texture required in pastries produced from "all purpose flour," another term in the trade for flour manufactured from substantially all soft wheat. A further consideration, in addition to this fineness in texture, is the characteristic of "shortness" required in any pie crust of superior quality, and such results have been achieved heretofore only from all purpose or pastry flours produced from essentially soft wheat flour.

Applicant has found that a critical percentage of hard flour, or flour produced from winter wheat, may be combined with soft flour produced from summer-ripening wheat, to provide a pie crust dough combining with the essential requirements of superior texture, shortness and taste, an inherent strength and elasticity to permit the convenient handling thereof without likelihood of stretching, tearing or puncturing between the final rolling step and the placing thereof within the pie tin or other baking receptacle prior to the introduction of the filling and/or baking thereof.

Accordingly, the instant inventive concept includes the mixing of so-called soft and hard flours in critical proportions and the production therefrom of a pie crust dough suitable for convenient handling in the manner to be described more fully hereinafter.

Since the ratios employed in this combination of hard and soft flours is considered as a portion of the present invention, one commercial recipe or formula for the production of the novel pie crust dough with which we are presently concerned is provided herein.

For the preparation of a one hundred and fifty pound batch of dough, the following ingredients are required, all parts being stated by weight:

|  | Pounds |
| --- | --- |
| Soft flour | 63 |
| Hard flour | 31½ |
| Shortening | 39 |
| Salt | 3¾ |
| Water | 18 |

From a consideration of the foregoing, it will be observed that the soft and hard flours are provided in a ratio of 2 to 1, respectively.

To the flour, shortening and salt, water is added in the following manner:

8 pounds of water is worked by hand for 1½ minutes into the stated ingredients, at which time there will have been complete absorption.

2 additional pounds of water is then worked by hand into the dough mixture for ½ minute.

8 additional pounds of water is then worked by hand into the mixture for 1 minute, in all instances complete absorption occurring.

The prepared dough is then tested in the well known manner for adhesive characteristics, or stickiness, and dependent upon atmospheric conditions, i. e. in the event of extreme lack of humidity, it may become necessary to add an additional small quantity of water; however, under normal or average weather conditions, the proportions stated above will be entirely accurate.

The prepared batch of pie crust dough is then subdivided by hand into pats of approximately one pound each and then each pat is further subdivided by hand into small particles, thoroughly kneaded, and hand rolled into a substantially flat piece of dough having a surface area of approximately thirteen by twenty inches. This dough is then taken up, made into a pat again and fed into a rolling machine of conventional characteristics such as is well known in this art and believed to require no additional description here. Such a rolling machine is set to produce sheet pastry of a thickness approximating one-sixteenth of an inch and, from such sheet pastry, portions of a predetermined size in accordance with the commercial item desired are severed or otherwise detached.

It has been found in actual practice that from a batch of dough having a weight of approximately one hundred and fifty pounds, some three hundred and forty to three hundred and fifty pie crusts twelve by eighteen inches in size and having a thickness of approximately one-sixteenth of an inch may be produced, the weight of each such pie crust approximating seven ounces.

Desirably such portions are substantially rectangular, approximately twelve by eighteen inches in size and each such portion, having a thickness approximating one-sixteenth of an inch, comprises one of the pie crusts of the present invention.

Alternatively, dough rolling equipment is commercially available which will produce automatically from the prepared batch of dough, pie crust dough in finished condition, i. e. of appropriate size and thickness, and from the point of view of economy of operation such equipment is particularly desirable.

Pie crusts produced from dough prepared in the above described manner have uniformly superior characteristics, combining the essential factors of exceptional flakiness and delectable taste. It is considered that three factors go to produce these results:

1. The critical blend of soft and hard flours.
2. The quantity of water employed and the manner in which such water is added to the solid ingredients.
3. The manner in which the dough is handled, i. e. separated into pats, hand kneaded, hand rolled and returned to pats prior to being introduced into the rolling machine.

The most admirable characteristic of the finished pie crust dough produced as described hereabove, separate and apart from the issues of uniformity and generally pleasing taste found in the baked article, is the ability of an unskilled individual to handle each portion of pie crust dough without attendant hazards of deformation, tearing, puncturing, or the like, as would be expected of pie crust dough, which is notoriously difficult to manipulate. On the contrary, the pie crust dough of the present invention is readily handled without susceptibility to damage and one novel method of packaging thereof has been illustrated in the drawing forming part of the instant application.

As illustrated in Fig. 1 of the drawing, each piece of pie crust dough P is rolled into a rectangular sheet having a thickness of approximately one sixteenth of an inch, a desirable size of such sheet being twelve by eighteen inches with substantially squared sides, although such sides may be rounded or of other peripheral or external configuration without departing from the present inventive concept. Following the step of producing such sheets P of pie crust dough, each sheet is lifted manually and placed upon a wrapper W of suitable material, the length and width of such wrapper being slightly in excess of the corresponding dimensions of the pie crust dough, thus the edges of the wrapper extend beyond the edges of the pie crust dough.

While the material from which the wrapper W is formed comprises no essential part of the present invention, it being essentially only that such material be sanitary, comparatively thin, and entirely flexible. Suitable fabric or paper may be employed for such wrappers, a particularly economical material which is readily available commercially and has been found in practice to be particularly satisfactory being a relatively thin variety of waxed paper.

The pie crust dough P having been placed upon the wrapper W with the edges of the wrapper extending beyond those of dough per se, one extending edge of the wrapper is turned or bent over the adjacent edge of the pie crust dough and a manual rolling operation is undertaken whereby the pie crust dough is rolled into a compact roll or cylinder, as illustrated in Fig. 3 of the drawing, the waxed paper preventing adjacent surfaces of dough from intimate contact whereby adhesion may take place. In practice the finished cylinder of rolled pie crust dough, completely protected by waxed paper since such wrapping overlaps the edges thereof, will have a substantially uniform diameter of one and one-quarter inches and a length of twelve inches, when the rolling operation takes place beginning with one of the shorter sides of the pie crust dough. Obviously, if the rolling operation were undertaken beginning with the edge of the dough which approximates eighteen inches in length, the rolled cylinder would be of such length and of lesser diameter.

Such a rolled cylinder C presents no problems, first in handling thereof and second in a quick freezing operation. Desirably such freezing may be accomplished after the cylinder has been placed within a suitable container, the overall dimensions of which would closely approximate those of the rolled cylinder per se, or packaging in such a container may take place after the quick freezing operation.

In this highly economical and most convenient manner, the frozen pie crust dough may be packaged within a comparatively thin, light-weight container of cardboard or other suitable material and is ready for shipment in commerce, no especial care being required for the handling thereof, the single requisite being that inherent to all frozen foods, viz: that the item be maintained continuously at a temperature below freezing. Further, length of storage prior to the vending thereof and/or actual use by the ultimate consumer has no adverse effect upon the product. It will be understood that in accordance with accepted standards, as well as certain statutory requirements, a small amount of an adequate preservative is added to the ingredients from which the present food product is prepared, a composition in relatively wide spread use for such purposes comprising sodium propionate. However, the quantity required is relatively negligible and thus has not been stated as an essential ingredient; additionally, other chemical compositions or preservatives may be used for the identical purpose.

No skill is required in connection with ultimate use of the frozen pie crust dough of the present invention. It is necessary only to permit the frozen dough to thaw sufficiently where easy handling or unrolling is possible, this being accomplished in approximately one hour. The sheet of pie crust dough is then placed within a suitable baking tin desirably of smaller size than the dimensions of the pie crust dough per se and trimmed with respect to the overlapping edges as is well known in this art. The selected filling is then added and the trimmed strips of surplus dough may, if desired, be used for stripping the top of the pie. Additionally, other substances as, for example, grated cheese, may be pressed into such stripping, dependent upon the tastes of the consumer and the nature of product contemplated.

While pies of the character discussed hereabove are commonly termed "turnover pies," the use of the present product is by no means similarly limited. Thus, the pie crust dough, when thawed, may be used for such items as dumplings, deep-dish pies, or any other food items where a pastry crust or content is desired. Further, where a pie is contemplated having a crust surface as well as base, it is only necessary to use two of the pie crusts discussed herein, the second crust to be positioned above the filling, appropriately trimmed, and the peripheral edge thereof appropriately "pinched" to the adjacent edge of the lower crust or base.

There has thus been described a novel frozen pie crust dough which may be manufactured, shipped and distributed to the ultimate consumer with a maximum of ecenomy, and where such consumer is provided with a superior, tender and flaky pie crust which is already rolled out and ready for baking.

In commercial practice, it has been found advantageous to package the rolled pie crust dough of the present invention in the waxed paper wrapper described and to package the rolled dough in either a conventional carton, which may open along one side thereof or at the opposite ends, or in a cylindrical open-end container resembling an ordinary mailing tube. It will be understood that, with overlapping wrapped ends, no problems are presented in connection with the withdrawal of the packaged dough from such a tubular container.

Additionally, it is within the scope of the invention that the instant pie crust dough be prepared and vended in non-frozen status wherein only a reduced temperature is required for proper maintenance, such as is to be found under conditions of ordinary refrigeration. It is common practice to prepare and package dough in the form of finished biscuits, or the like, and vend such items without any requirement for quick or other freezing thereof. Under these proposed conditions, there will be no departure from the herein described methods of preparation and wrapping except for the omission of the quick freezing step, the packaged article being placed under adequate refrigeration, i. e. at a temperature approximating 40°–45° F., and maintained at a related temperature throughout the intervals of transit, handling and vending.

It will be obvious to those skilled in this art that various changes may be made in this invention without departing from the spirit and scope thereof and, therefore, this invention is not limited by that which is shown in the drawing or described in the specification but only as indicated in the appended claims.

What is claimed is:

1. The method of preparing pie crust dough in thin sheet form including the following steps: (a) blending a mixture of the following ingredients into a batch, all parts being stated by weight:

|  | Pounds |
|---|---|
| Soft flour | 63 |
| Hard flour | 31.5 |
| Shortening | 39 |
| Salt | 3.75 |
| Water | 18 |

(b) subdividing the prepared batch of dough into pats of about one pound each; (c) subdividing each pat into relatively small particles; (d) kneading each particle by hand; (e) combining all said particles and rolling by hand to sheet form; (f) returning said sheet form to pat form and feeding it into a dough rolling machine to produce a thin sheet pastry approximately 1/16 of an inch in thickness.

2. The method defined in claim 1, wherein each preformed pie crust is rolled upon itself into the shape of a self-sustained cylinder and is quick-frozen and packaged for shipment as an article of commerce, ready for use upon thawing.

3. The method defined in claim 1, wherein the flour, shortening and salt are first blended together and the water is then added in three stages in the following manner: 8 lbs. of water is worked by hand into the mixture for 1½ minutes; 2 lbs. of additional water is worked by hand into the mixture for ½ minute; and 8 lbs. of additional water is worked by hand into the mixture for 1 minute, complete absorption of the entire water content taking place.

4. As an article of commerce, a packaged frozen pie crust comprising a rolled cylinder of relatively thin sheet pastry, said cylinder being enclosed within a flexible sheet of wrapping material rolled integrally therewith, said sheet of pastry being ready for baking upon thawing and produced from the following combination of ingredients:

| | Pounds |
|---|---|
| Soft flour | 63 |
| Hard flour | 31.5 |
| Shortening | 39 |
| Salt | 3¾ |
| Water | 18 |

References Cited in the file of this patent

UNITED STATES PATENTS

| 1,988,058 | Traller | Jan. 15, 1935 |
| 2,305,712 | Kaefer | Dec. 22, 1942 |

OTHER REFERENCES

"Modern Cereal Chemistry" by Kent-Jones and Amos, The Northern Publishing Co., Ltd., Liverpool, 1947, pages 289 and 296.